March 26, 1940. R. DE LA TRAMERYE 2,194,888
SHIELDING SYSTEM FOR THE IGNITION CIRCUITS OF INTERNAL COMBUSTION ENGINES
Filed July 15, 1936 5 Sheets-Sheet 1

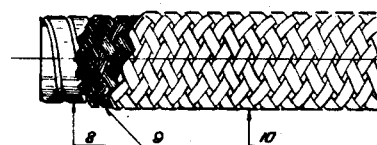
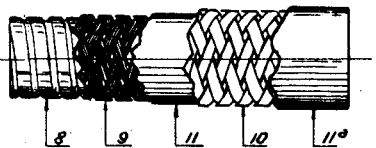
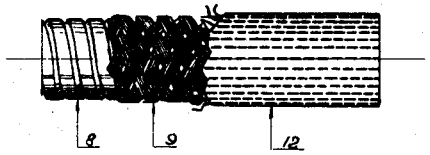
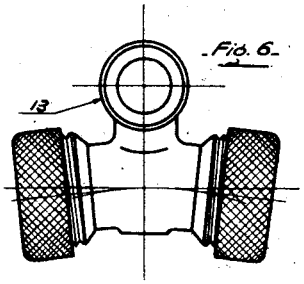
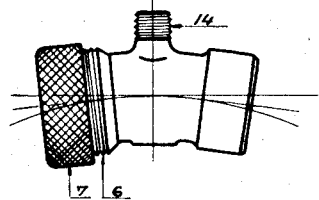
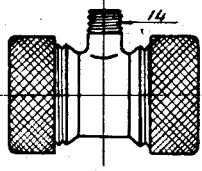
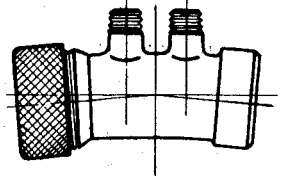
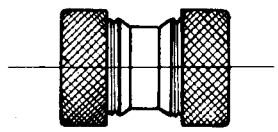
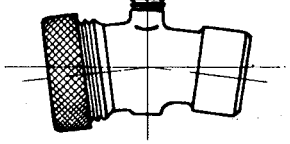

March 26, 1940.   R. DE LA TRAMERYE   2,194,888
SHIELDING SYSTEM FOR THE IGNITION CIRCUITS OF INTERNAL COMBUSTION ENGINES
Filed July 15, 1936   5 Sheets-Sheet 5
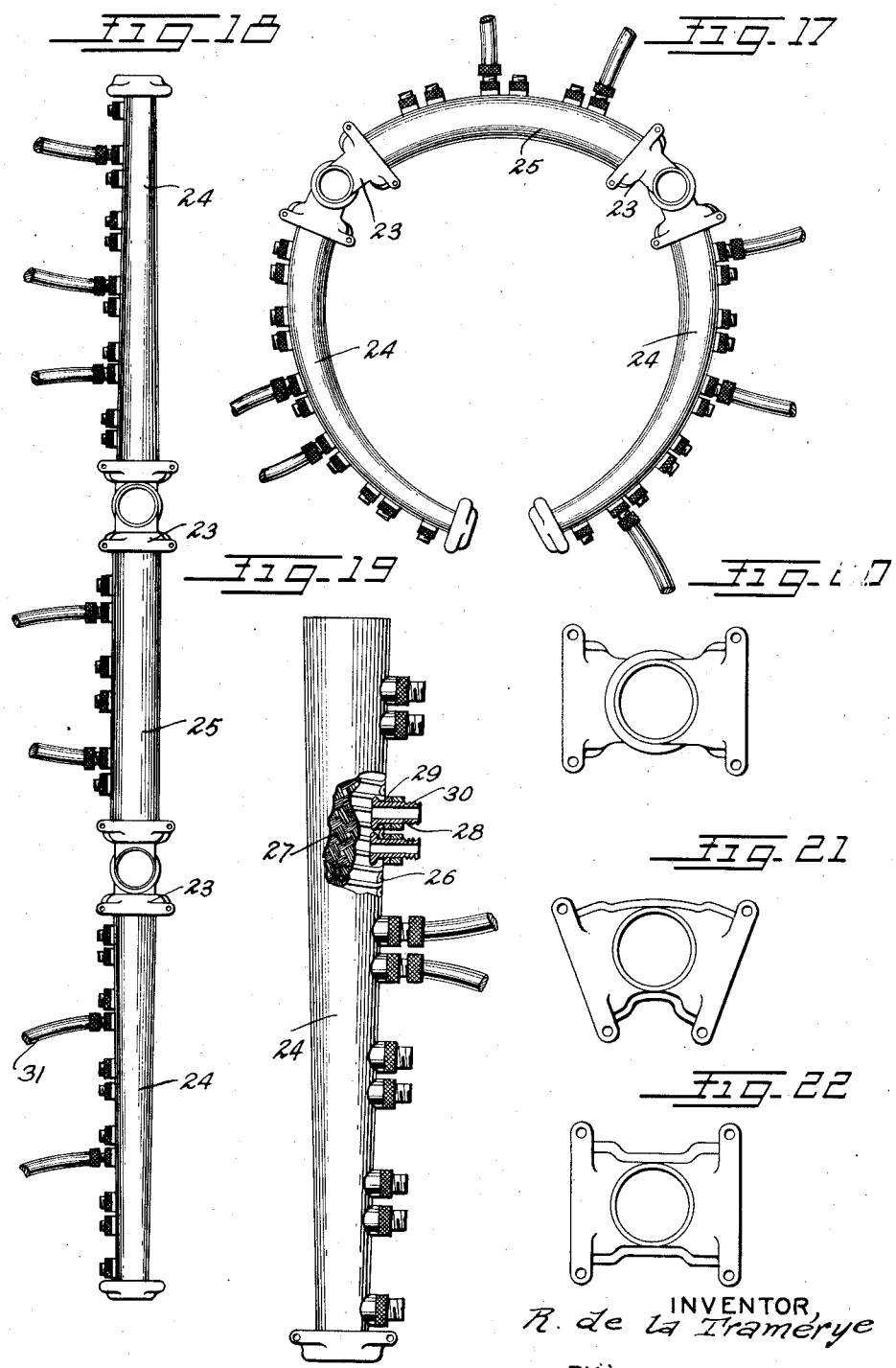

Patented Mar. 26, 1940

2,194,888

UNITED STATES PATENT OFFICE 2,194,888

SHIELDING SYSTEM FOR THE IGNITION CIRCUITS OF INTERNAL COMBUSTION ENGINES

Raymond de la Tramerye, Paris, France, assignor to Societe Anonyme Tubest, Paris, France, a corporate body of France Application July 15, 1936, Serial No. 90,798
In Germany July 20, 1935

15 Claims. (Cl. 123—148)

The present invention concerns shielding systems for the ignition circuits of internal combustion engines (such as airplane or automobile engines), these systems serving, on the one hand, to protect the radio apparatus of the vehicle against perturbation by the ignition system, and on the other hand, to protect this ignition system against perturbations, either willful or not, that might be exerted from the outside in such manner as to prevent ignition.

The shielding elements for the cables of ignition spark plugs must be adapted to the shape and type of the engines with which they are to cooperate and therefore, as there are many shapes and types of engines, every shielding system must practically be made especially for each type of engine. This involves a serious increase of the cost of the engine, the necessity of a longer delay for the manufacture of the engine, the necessity of experts, the lack of interchangeability, and, in most cases, the impossibility of checking up the state of the wires of the spark plugs when the engine is in service.

The object of the present invention is to provide a shielding system of the kind above referred to which obviates these drawbacks.

This shielding system consists of a tube constituted by the combination of standard rigid elements carrying wide shield conduits and flexible elements interconnecting at least some of said rigid elements, the various elements, as well rigid as flexible, being interchangeable.

With such an arrangement, it is possible, with a limited number of standard pieces, to constitute in a relatively short time, without requiring the help of an expert, a shielding system of any shape and size for use in connection with any kind of engine (radial, in line, etc.) including any number of cylinders.

In an embodiment of the invention, the rigid elements include all the wire outlets, the flexible elements serving merely to connect together some of the rigid elements, so as to give the system the required shape.

In another embodiment of the invention, the rigid elements are fitted with the outlets for the cables leading to the magnetos or the like, the flexible elements being provided with outlets for the whole or a part of the cables leading to the spark plugs.

Finally, some at least of the rigid elements may be made of at least two parts movable with respect to each other, for instance pivoted to each other, so as further to increase the capacity of deformation of the whole system.

Other features of the present invention will result from the following detailed description of some specific embodiments thereof.

Preferred embodiments of the present invention will be hereinafter described, with reference to the accompanying drawings, given merely by way of example, and in which:

Figs. 3 to 12 are separate elevational views of different elements (some rigid and some flexible) serving to constitute a shielding system according to the invention;

Figs. 13 to 16 inclusive are separate views showing some examples of rigid elements for a shielding system according to the invention;

Fig. 17 is a diagrammatic front view of still another embodiment of the invention, showing a shielding system which is given a shape corresponding to a radial engine;

Fig. 18 shows the same shielding system straightened out so as to be adapted for use in connection with an engine having its cylinders in line;

Fig. 19 shows a flexible element with outlets for the cables leading to the spark plugs;

Figs. 20, 21 and 22 are separate views of rigid elements for use in a shielding system according to the present invention as illustrated by Figs. 17, 18 and 19.

Figure 1:
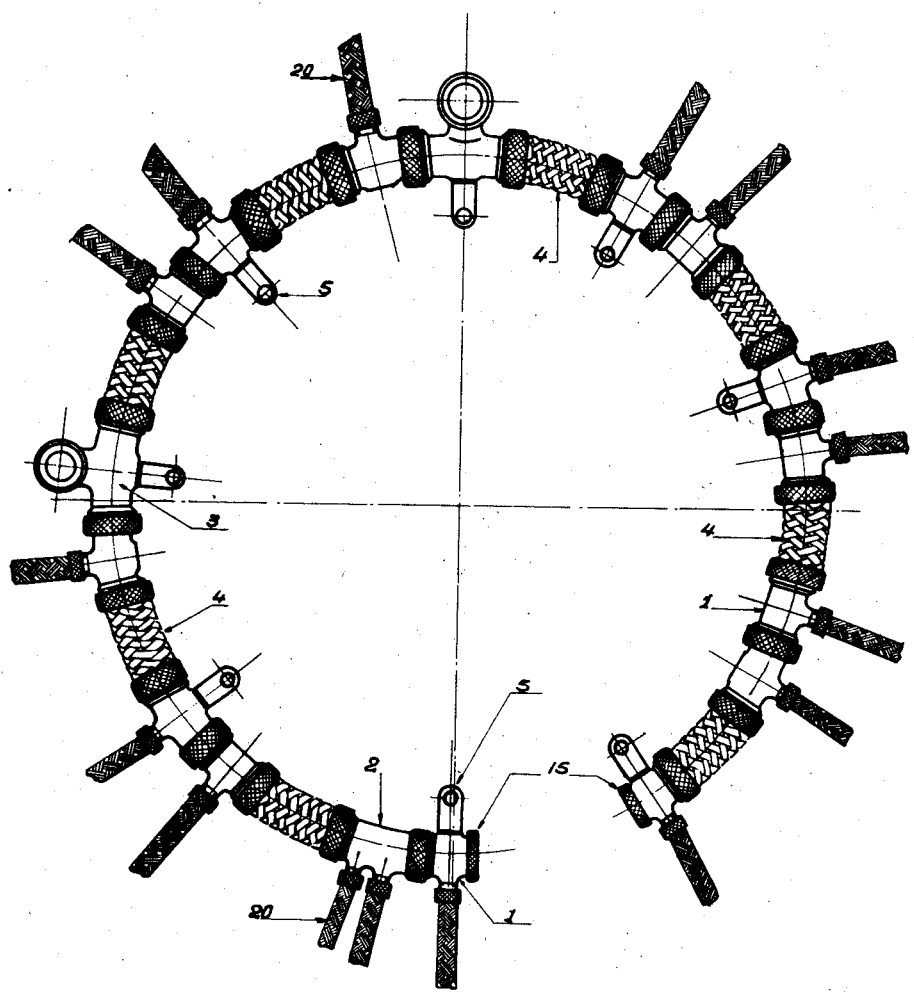
Fig. 1 is a diagrammatic front view of a shielding system made according to the present invention, for use in connection with a radial engine having sixteen cylinders, the tubular parts of the system being all of the same diameter.

In Fig. 1, I have shown, at 1, 2 and 3, rigid elements of the shielding system, and at 4 the flexible elements which serve to connect together some of these rigid elements, the other rigid elements being directly connected together. The rigid elements are arranged to receive the cables of the spark plugs or those of the magneto. For instance, elements such as 1 and 2 are provided respectively with one or two inlets for the spark plug cables, and elements such as 3 are provided with an inlet for a series of cables from the magneto. Certain of these elements further carry parts for fixation of the shielding system to the engine, for instance lugs 5. The rigid elements are provided at their ends with any suitable assembling means, such for instance as the threads and collars shown at 6 and 7 in the drawings.

Figure 2:
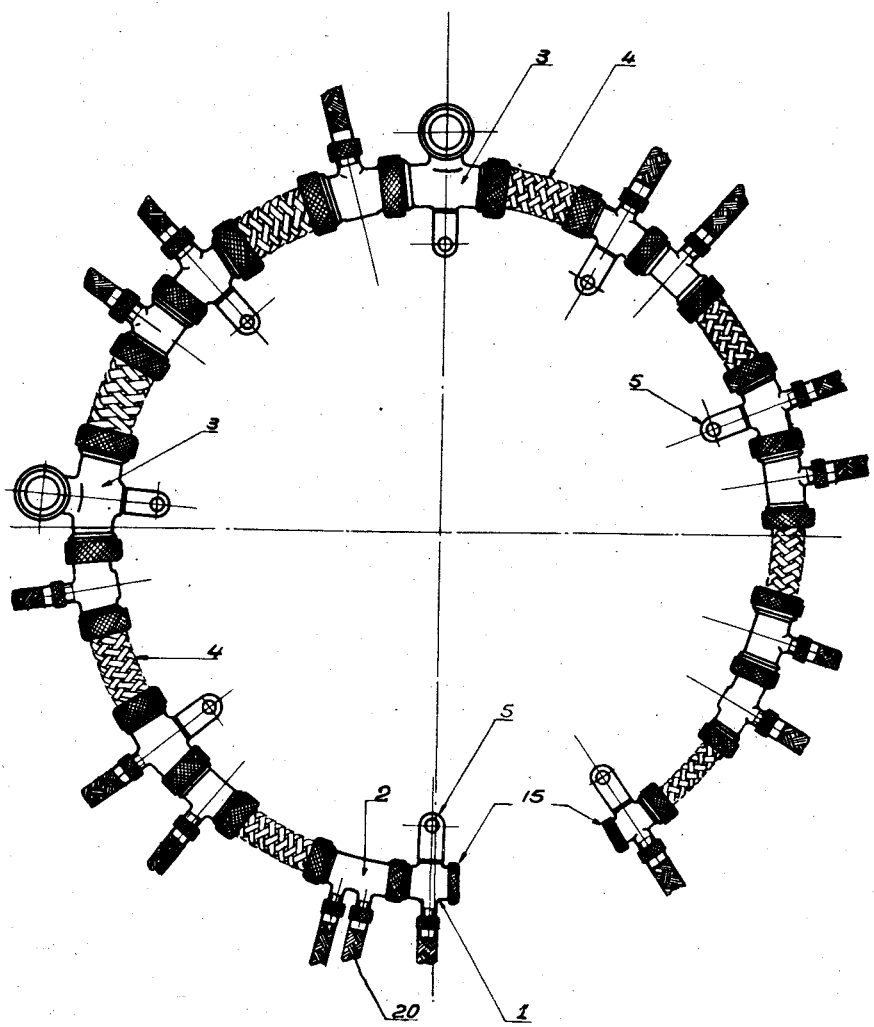
Fig. 2 is a view, similar to Fig. 1, of another shielding system according to the present invention in which the diameter of the main tubular part decreases from the central portion of the system toward the ends.

It will be readily understood that, by making use of standard elements according to the invention, it is possible to constitute shielding systems of any shape and size, adapted to be fitted to any engine, whatever be the type thereof or its number of cylinders. The shielding systems illustrated by Figs. 1 and 2 are made for engines of the radial type but it is clear that it is possible, by straightening them up, to adapt them for use with engines having their cylinders arranged in line.

The shielding system illustrated by Fig. 1 is made of elements of a constant diameter.

The invention is also applicable to the case of shielding systems the tubular parts of which are of non uniform diameter, which permits of reducing the weight of the system by giving it a smaller diameter in the portions where the number of wires to be protected is smaller. For instance, in the example illustrated by Fig. 2, the diameter of the shielding means decreases near both ends thereof, since the number of wires decreases in these portions.

In Figs. 3, 4 and 5, I have shown three embodiments of flexible elements, these elements being illustrated merely by way of example.

The flexible element of Fig. 3 consists of a flexible pipe consisting of a sectional metal band 8 wound helically and having its turns fixed to one another, with the interposition of suitable packing means. This pipe is covered with two braids, one, 9, being made of metallic wires, and the other, 10, which surrounds the first, being made of small bands, also of metal.

The flexible element shown by Fig. 4 also consists of a pipe 8 covered successively with a first braid 9, a second textile braid 11, coated with an insulating varnish, a third braid 10 of metal band, and a fourth textile braid 11ª coated with varnish, analogous to the second one.

The element shown by Fig. 5 consists also of a pipe 8 covered with a first braid 9. In this example, the second braid, 12, which is made of a textile material and coated with varnish, includes metallic wires disposed along the generatrices over the whole length of the element and embedded in the matter of the braid.

It should be well understood that the flexible elements may be made in any other way and in particular their parts may be combined together in a different manner.

In Figs. 6, 7, 8, 9, 11, I have shown a certain number of rigid elements.

Fig. 6 shows a rigid element permitting the grouping of all the spark plug wires fed by the same magneto. The wires enter the element through a swan-neck conduit 13. The body of this element is shown as slightly bent. Of course, I may also provide elements of similar structure but of rectilinear shape. The element of Fig. 6 corresponds to the elements 3 of Figs. 1 and 2.

The rigid element shown by Fig. 7 is intended to receive a single spark plug wire, the outlet taking place through passage 14, which is screw-threaded in such manner as to receive the coupling of the shielding of the spark plug wire. This element corresponds, for instance to one of the elements 1 of Fig. 1 or Fig. 2. In Fig. 7, the body of the element is of slightly bent shape. One of the ends is slotted and is provided with screw threads 6 on which a nut 7 can screw. This end is intended to receive the smooth and male end of the adjacent element. The other end of the element of Fig. 7 is smooth and forms the male part to be engaged in the adjacent element.

In Fig. 8, I have shown an element of the same kind as that of Fig. 7, but of straight shape. Furthermore, the fixation means provided at both ends are similar.

In Fig. 9, I have shown a bent rigid element intended to receive two spark plug wires.

In Fig. 10, I have shown a coupling for assembling together two flexible elements. This coupling may be utilized in the case of shielding systems having long portions without outlets for the spark plug wires.

In Fig. 11, I have shown an example of an end plug for the shielding system, also visible at 15 in Figs. 1 and 2.

In Fig. 12, I have shown an element of the type of Fig. 7, but in which one of the ends is of smaller diameter than the other end. This element is intended, as above explained with reference to Fig. 2, to permit a gradual reduction of the weight at the ends of the shielding system. I may provide elements of this type of various sizes, so as to obtain a gradual reduction of the diameter of the tubular shielding system.

In Figs. 13, 14, 15 and 16, I have shown, by way of example, two embodiments of rigid elements.

Figure 13:
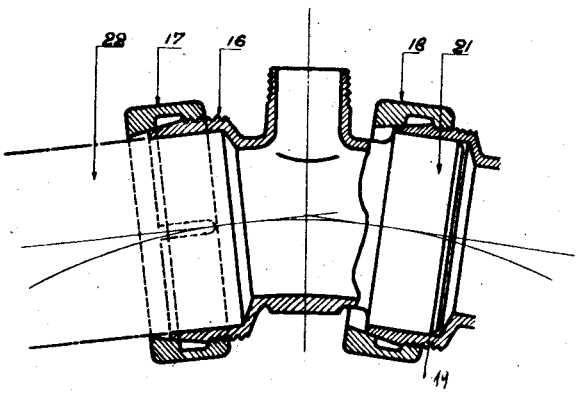

The rigid element shown in Fig. 13 consists of a metallic piece provided, at one of its ends, with a slotted part with outer threads 16 intended to cooperate with a tightening nut 17, so as to hold the male end 22 of the adjacent element. The other end of the element shown by Fig. 13 is provided with a male smooth part 21 intended to engage in a female part 19 of the adjacent element provided with a tightening nut 18.

Figure 14:
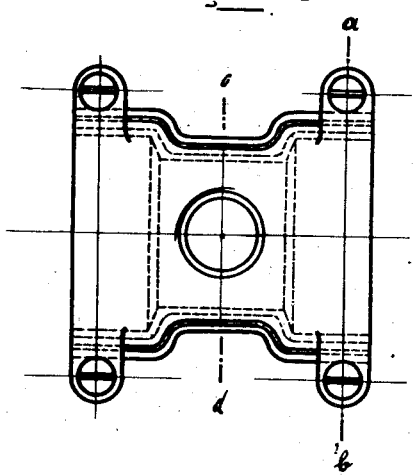
Figure 15:
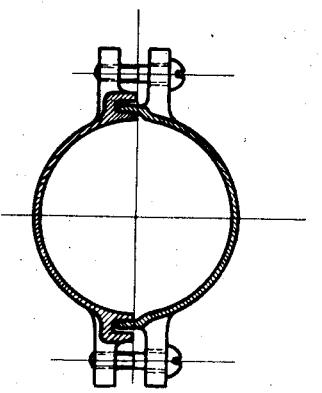
Figure 16:
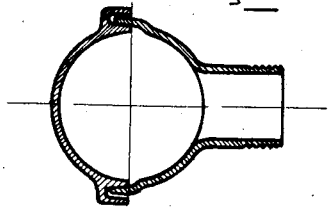

Fig. 14 shows another embodiment in which the fixation of the flexible elements to the rigid elements is obtained by tightening of the last mentioned elements on the first mentioned ones. Figs. 15 and 16 are two sectional views, on the lines ab and cd, respectively, of Fig. 14.

The spark plug wires may be shielded by flexible pipes, for instance of the same kind as those described with reference to the flexible elements of the shielding system. Such pipes are shown at 20 in Figs. 1 and 2. The shielding of the spark plugs and of the magnetos may be obtained through any suitable means, either of a known kind or not.

In Figs. 17 and 18, I have shown a shielding system in which the number of rigid elements 23 is reduced to two. These elements include openings through which pass the cables leading to the magnetos or the like. This shielding system further includes three flexible elements 24, 24, 25 including openings for the passage of the shielded cables leading to the spark plugs. In the embodiment of Fig. 17, the shielding system is curved in such manner as to be adapted to the shape of a radial engine.

In the embodiment of Fig. 18, the shielding device is straightened up, so as to be adapted to the case of an engine having its cylinders in line.

The shielding system according to these embodiments is essentially characterised in that the flexible elements not only serve to connect rigid elements with one another but also are provided with outlets for the cables leading to the spark plugs. Of course, the number of elements, as well rigid elements as flexible elements, may be varied according to the type and size of the engine.

In these embodiments, the rigid elements are adjustable or jointed, that is to say consist of at least two parts adapted to occupy different positions with respect to each other, so as to permit of suitably directing the ends connected to the flexible elements, which further increases the capacity of adaptation of the whole system. In the example shown by the drawings, deformability of the rigid elements is ensured by means of a pivoting connection between the two parts of each element.

In the embodiments of Figs 17 and 18, the flexible elements are provided, as above explained, with openings. Of course, these openings may be given any shape and disposition, without departing from the principle of the present invention. However, I have found that it is particularly advantageous to provide outlets for the shielded cables leading to the spark plugs in the flexible elements 24, for instance in the manner hereinafter described.

This method consists in working on these flexible elements when they are bent (so as to bring both the turns of the metallic flexible pipe and the threads that form the external braid to the maximum distance from each other), in tinning said braid at the places where holes are to be made, and in driving said holes through the bent portion of the flexible element. Then small tubular elements are inserted, locally stopping the play of the turns of the pipe, fixing the edges of the braid and acting as couplings for the flexible tubes that serve to shield the spark plug, or magneto, wires.

In Fig. 19, I have shown on an enlarged scale, one of the flexible elements 24. Reference character 26 designates the turns of the pipe and 27 the metallic braid. 28 are the tubular elements above referred to, 29 the nuts that serve to fix said elements, and 30 the threads for the fixation of the pipes that shield the spark plug wires.

In Fig. 20, I have shown, on an enlarged scale a rigid element including two parts pivoted to each other.

Fig. 21 shows another rigid element, made of a single part, capable of replacing eventually the rigid element of Fig. 20, the ends of the element of Fig. 21 making a certain angle with each other.

The rigid element shown by Fig. 22 is similar to that of Fig. 21, but it is of rectilinear shape.

It will be readily understood that the shielding system according to the present invention, while obviating the drawbacks of existing shielding systems, which have to be done especially for each case, by experts, permits of easily reaching the wires. It suffices to separate certain elements from one another, for instance by unscrewing, and to cause them to slide along the wire for uncovering the portion of the wire that is to be examined.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

In these claims, the expression "rigid element" is taken in its broadest meaning, as opposed to "flexible element," that is to say it designates both elements made of a single rigid part and elements made of two or more rigid parts adjustably interconnected, that is to say pivoted together.

What I claim is:

1. A rigid element for use in a shielding system of the type described for an internal combustion engine ignition system, consisting of two rigid tubular parts adjustably assembled together about a common pivoting axis, and means on at least one end of one of said parts for assembling it with an adjacent element, at least one of said parts being provided with a wire outlet transverse thereto.

2. A shielding system for an internal combustion engine ignition system, which consists of a single main shielding conduit including at least two standard interchangeable rigid tubular elements provided with transverse wire outlets, and a flexible conduit element assembled at its respective ends to the corresponding ends of said rigid tubular elements, respectively, so as to interconnect them.

3. A shielding conduit structure for an internal combustion engine system, which comprises, in combination, at least two standard interchangeable rigid tubular elements provided with transverse wire outlets, a flexible conduit element assembled at its respective ends to corresponding ends of said rigid tubular elements respectively, so as to interconnect them, and two other flexible conduit elements assembled each at one of its ends to one of the other ends of said rigid tubular elements.

4. A shielding system for an internal combustion engine ignition system, which consists of a single main shielding conduit including a plurality of standard interchangeable rigid tubular elements provided with transverse wire outlets, respectively, assembled in series, and flexible conduit elements each fixed at its respective ends to corresponding ends of two consecutive rigid tubular elements, respectively, so as to interconnect them.

5. A shielding system for an internal combustion engine ignition system, which consists of a single main shielding conduit including, in combination, at least two standard rigid tubular elements provided with transverse wire outlets, and a flexible conduit element, assembled at its respective ends to the corresponding ends of said rigid tubular elements, respectively, so as to interconnect them, said flexible conduit element being provided with at least one wire outlet.

6. A shielding system for an internal combustion engine ignition system, which consists of a single main shielding conduit including, in combination, at least two standard interchangeable rigid tubular elements provided with transverse wire outlets, a flexible conduit element assembled at its respective ends to corresponding ends of said rigid tubular elements respectively, so as to interconnect them, and two other flexible conduit elements assembled each at one end to one of the other ends of said rigid tubular elements, respectively, at least one of said flexible conduit elements being provided with at least one wire outlet.

7. A shielding system for an internal combustion engine ignition system, which consists of a single main shielding conduit including, in combination, a plurality of standard interchangeable rigid tubular elements provided with transverse wire outlets, respectively, assembled in series, and at least one flexible conduit element fixed at its respective ends to corresponding ends of two consecutive rigid tubular elements, respectively, so as to interconnect them, said flexible conduit element, being provided with at least one wire outlet.

8. A shielding system for an internal combustion engine ignition system, which comprises, in combination, at least two standard interchangeable rigid tubular elements, each made of two tubular parts adjustably assembled together about a common pivoting axis, at least one of said parts being provided with at least one transverse wire outlet, and a flexible conduit element assembled at its respective ends to the corresponding ends of said rigid tubular elements, respectively, so as to interconnect them.

9. A shielding conduit for an internal combustion engine ignition system, which comprises, in combination, at least two standard interchangeable rigid tubular elements provided with transverse wire outlets, each of said elements consisting of two tubular parts adjustably assembled together about the axis of the corresponding wire outlet, a flexible conduit element assembled at its respective ends to corresponding ends of said rigid tubular elements respectively, so as to interconnect them, and two other flexible conduit elements assembled each at one of its ends to one of the other ends of said rigid tubular elements, respectively.

10. A shielding system for an internal combustion engine ignition system, which comprises, in combination, a plurality of standard interchangeable rigid tubular elements, each made of two tubular parts adjustably assembled together about a common pivoting axis, at least one of said tubular parts being provided with at least one transverse wire outlet, respectively, these elements being assembled in series, and at least one flexible conduit element fixed at its respective ends to corresponding ends of two consecutive rigid tubular elements, respectively, so as to interconnect them.

11. A shielding system for an internal combustion engine ignition system, which comprises, in combination, a plurality of standard interchangeable rigid tubular elements, each made of two tubular parts adjustably assembled together about a common pivoting axis, at least one of said tubular parts being provided with at least one transverse wire outlet, respectively, these elements being assembled together in series, and a plurality of flexible conduit elements, each fixed at its respective ends to corresponding ends of two consecutive rigid tubular elements, so as to interconnect them together, said flexible conduit elements being provided with at least one wire outlet.

12. A rigid element for use in a shielding conduit structure of the type described for an internal combustion engine ignition system, which comprises, in combination, two rigid tubular parts adjustably assembled together about a common pivoting axis and provided with a transverse wire outlet along said axis, and means on the outer end of at least one of said parts for assembling it with an adjacent element of said shielding conduit structure.

13. A shielding conduit for an internal combustion engine ignition system, which comprises, in combination, at least two standard interchangeable rigid tubular elements provided with a transverse wire outlet on at least one of them, each of said tubular elements consisting of two tubular parts adjustably assembled together about a transverse axis, a flexible conduit element assembled at its respective ends to corresponding ends of said tubular rigid elements, respectively, so as to interconnect them, and two other flexible conduit elements assembled each at one of its ends to one of the other ends of said rigid tubular elements, respectively.

14. A shielding system for an internal combustion engine ignition system, which comprises, in combination, a plurality of tubular elements assembled in series, so as to form a single main shielding conduit, a part of these tubular elements being rigid, the others being flexible so as deformably to interconnect two consecutive rigid tubular elements, at least a part of said conduit elements being provided with transverse wire outlets.

15. The combination with a manifold for the ignition conductors of an internal combustion engine, said manifold being arcuate and adapted to embrace the engine shaft, of spark plug leads leading from the said manifold to the spark plugs and magneto leads establishing connection between the said manifold and a magneto, said manifold providing a casing for the ignition conductors and said manifold having sections of different flexibility.

RAYMOND DE LA TRAMERYE.